Oct. 24, 1961    R. E. SCHMECK ET AL    3,005,537
MAIL HANDLING APPARATUS
Filed Nov. 2, 1959    4 Sheets-Sheet 1
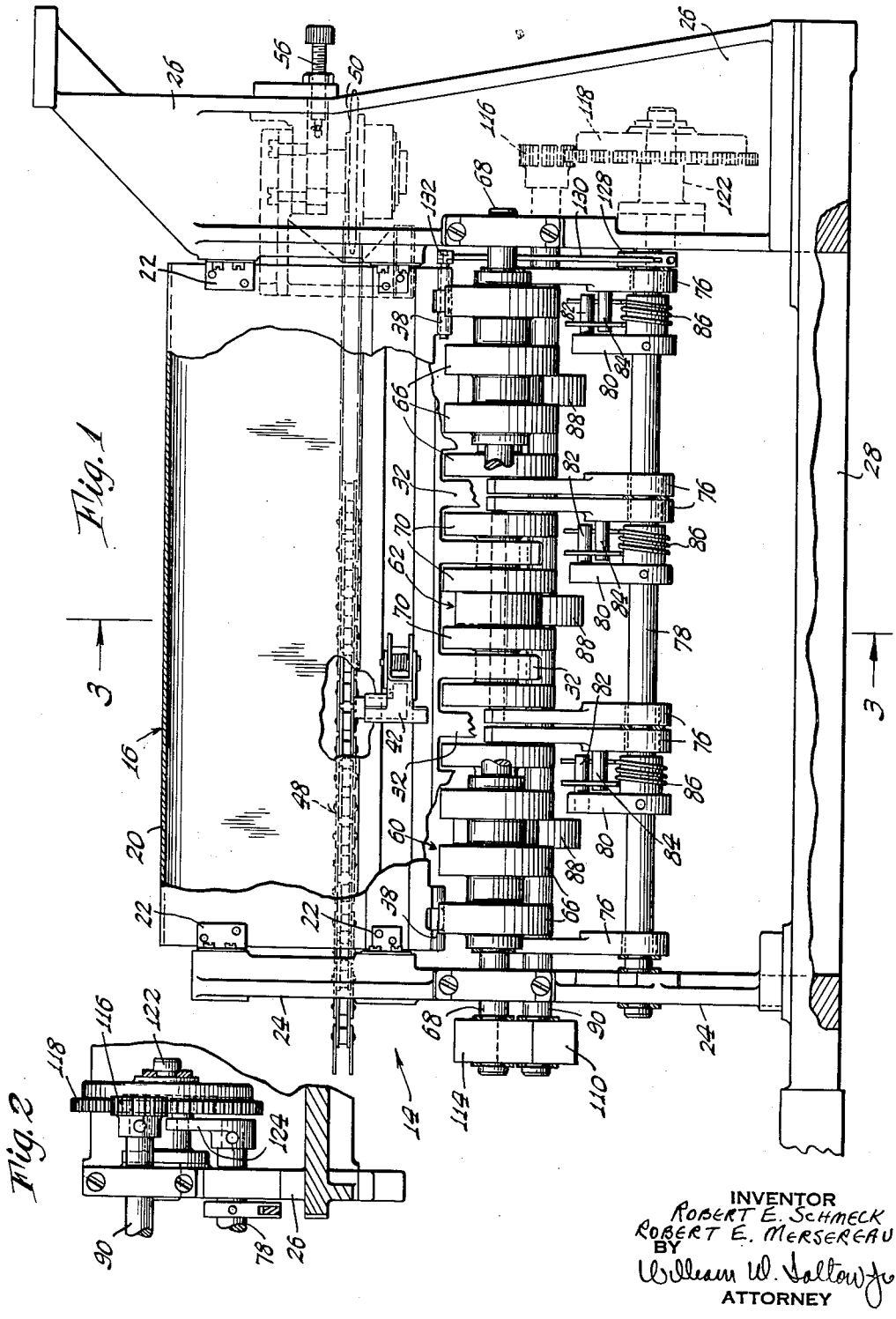
INVENTOR
ROBERT E. SCHMECK
ROBERT E. MERSEREAU
BY
William W. Salton Jr.
ATTORNEY

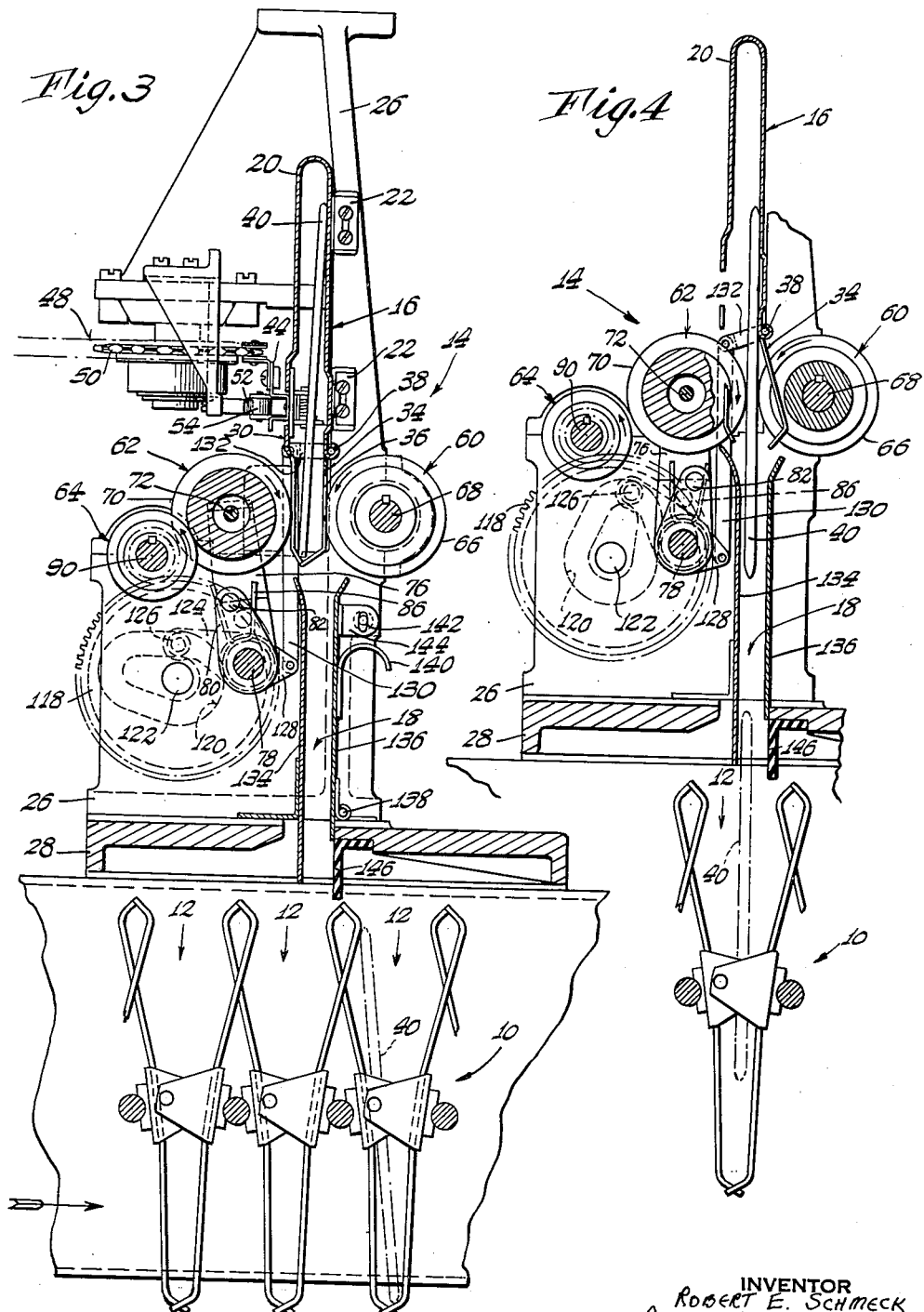

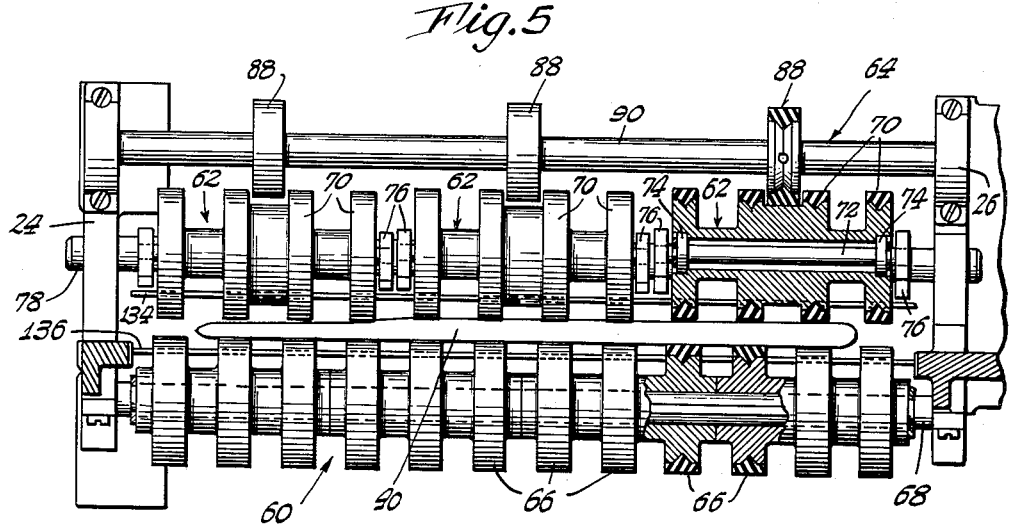

Oct. 24, 1961  R. E. SCHMECK ET AL  3,005,537
MAIL HANDLING APPARATUS
Filed Nov. 2, 1959  4 Sheets-Sheet 4
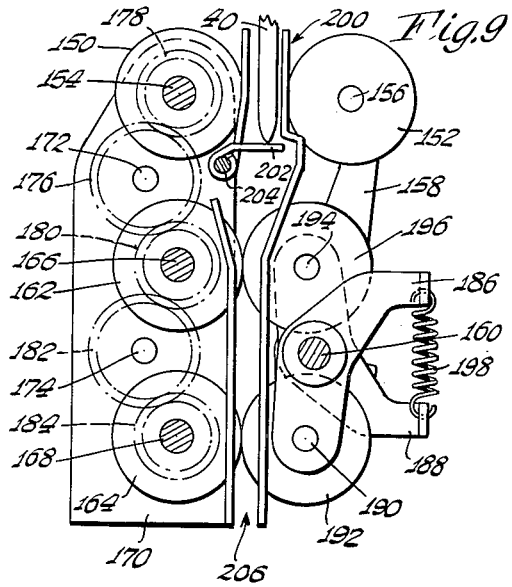
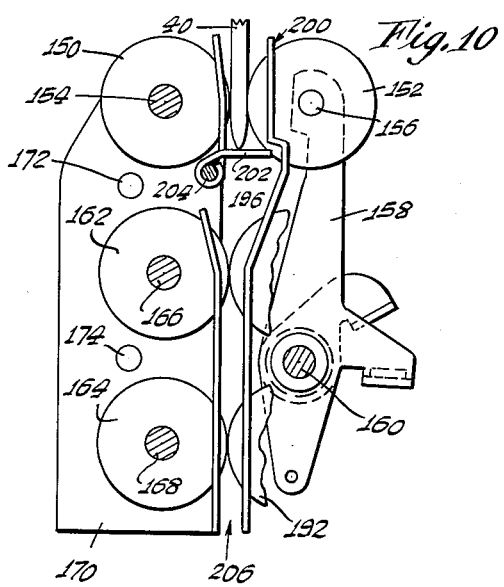
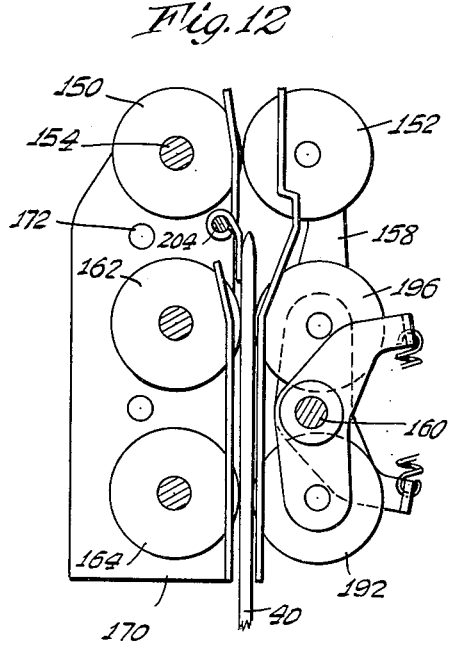
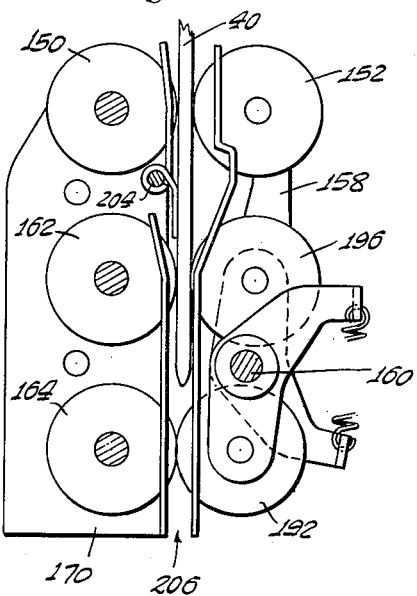
INVENTOR
ROBERT E. SCHMECK
ROBERT E. MERSEREAU
BY
ATTORNEY

United States Patent Office 3,005,537
Patented Oct. 24, 1961

3,005,537
MAIL HANDLING APPARATUS
Robert E. Schmeck, Riverside, and Robert E. Mersereau, Rowayton, Conn., assignors to Pitney-Bowes, Inc., Stamford, Conn., a corporation of Delaware
Filed Nov. 2, 1959, Ser. No. 850,180
4 Claims. (Cl. 198—105)

This invention relates to an apparatus for successively feeding articles such as pieces of letter mail into each of successively spaced receivers of a conveyor as the receivers move in succession past a loading location.

According to the present invention, a continuously movable conveyor, such as that disclosed in copending application Serial No. 786,134 to E. W. Tangard, now Patent No. 2,970,684, is operable to move a series of pockets or other receivers in one-by-one succession past a loading location. A feeding device is provided to feed articles such as pieces of letter mail in one-by-one succession at spaced intervals to the loading location thereby to load certain of the receivers as the latter move therepast. With one typical installation, the conveyor speed can be adjusted to any point along a range extending to upwards of 1000 receivers per minute moving past the loading location. It will be apparent that the greater the maximum speed of the conveyor and the narrower each receiver in the direction of movement of the conveyor, the more acute will be the problem of timing the action of the feeding device with the movement of the conveyor. Merely to decrease the time interval between the feeding of successive articles (i.e., to increase the frequency of feeding) at a rate proportional to any increase in conveyor speed does not suffice. This is the case because the length of time available for an article to be completely fed into a receiver once the leading edge of that article reaches the mouth of the receiver, is correspondingly decreased. That is, the length of time during which at least a portion of the mouth of each receiver is at the loading location is decreased when the speed of the conveyor is increased. This length of time, which might be sufficient for an article to be completely fed into a receiver when the conveyor is moving at one speed, might well not be sufficient when the conveyor speed is, for example, doubled or tripled. This problem is accommodated by the disclosed embodiment of the invention by increasing the speed at which the articles are fed, as well as the frequency thereof, proportionately with increases in the speed of the conveyor. By so accommodating this problem, the attendant advantage follows that the articles can always be fed at the minimum speed conveniently necessary completely to load each respective receiver during the limited time the latter is at the respective loading location.

The feeding device according to the embodiment disclosed herein and the disclosed modification thereof, provide the above-noted features and have other advantages. In this regard, said feeding device includes a pair of feed rollers, one of which is laterally shiftable back and forth between a retracted position and an advanced position. A letter is releasably supported between the feed rollers, and when the shiftable feed roller is in its retracted position, a peripheral feeding surface thereof is disposed out of engagement with the releasably supported letter. During its movement to the advanced position, the shiftable feed roller moves against the letter to move the letter, in turn, against the other feed roller. The peripheral feeding surfaces of the feed rollers are thus brought into engagement with the letter at opposite sides thereof. One of the feed rollers is operatively connected to be rotatably driven. Accordingly, when the condition occurs that the shiftable feed roller is in advanced position with a letter between the feed rollers and said one feed roller is rotatably driven, the letter will be impelled out from between the feed rollers and to the loading location. Said one feed roller is operatively connected to be positively driven by the conveyor whereby the speed at which the feeding device impels letters to the loading location is proportional to the speed of the conveyor. The frequency with which the letters are fed to the loading location is determined by the frequency with which the condition occurs that shiftable feed roller is in its advanced position and said one feed roller is rotatably driven. The means for shifting the shiftable feed roller and the means for driving the driven feed roller are both connected to be positively driven by the conveyor so that the frequency of letter feeding is proportional to the speed of the conveyor. It therefore follows that the action of the feeding device is synchronized with the movement of the conveyor regardless of conveyor speed changes.

Accordingly, an object of this invention is to provide a new and improved apparatus including a device for feeding pieces of letter mail and like articles.

A further object of this invention is to provide such an apparatus whereby the articles are fed in one-by-one succession at a frequency and speed proportional to the speed of a variable speed conveyor which includes a plurality of successive receivers to be loaded by the feeding device.

Another object of this invention is to provide such an apparatus which accommodates substantial variations in the thickness of each individual article to be fed, both from side-to-side and from top-to-bottom thereof.

Still another object of the invention is to provide such an apparatus which is simple and reliable in operation and which is economical to construct.

Further objects and advantages will become apparent as the description proceeds.

In the accompanying drawings:

FIG. 1 is a front elevational view, with parts broken away, of a feeding device according to one embodiment of the present invention;

FIG. 2 is a fragmentary plan view showing a cam, cam follower and associated structure for laterally shifting three side-by-side feed rollers of the feeding device between retracted and advanced positions;

FIG. 3 is a sectional view taken on line 3—3 in FIG. 1, this view showing one of the laterally shiftable feed rollers in its retracted position at which it is spaced from a non-shiftable feed roller and including, in addition, several receivers of a conveyor movable along a path adjacent the feeding device.

FIG. 4 is a view similar to FIG. 3 but showing said one shiftable feed roller in said advanced position at which it is biasing a letter againsts the non-shiftable feed roller;

FIG. 5 is a plan view partly in section of the shiftable and non-shiftable feed rollers along with associated structure, said shiftable feed rollers being shown in said advanced position with a letter between the feed rollers;

FIG. 6 is a view similar to FIG. 5 but including a portion of means including a sprocket chain, a cam and a spring clamp for effecting the delivery of a letter to a location between the shiftable and non-shiftable feed rollers prior to feeding of the letter, said shiftable feed rollers being shown in said retracted position;

FIG. 7 is an enlarged, fragmentary plan view of the spring clamp and cam shown in FIG. 6, this view showing the clamp just after its jaws have been opened by the cam to release a letter carried thereby;

FIG. 8 is a schematic representation of an arrangement whereby the feeding device of FIGS. 1–7 is connected to be positively driven by the conveyor;

FIG. 9 is a fragmentary, elevational view partly in section and showing a modification of the embodiment shown in FIGS. 1–8; and FIGS. 10–12 are views similar to FIG. 9 but showing the parts in succeeding operational positions.

Referring to FIG. 3, the embodiment of FIGS. 1–8 includes a conveyor generally designated at 10 which includes a plurality of pockets or receivers 12 for continuous movement of the latter in the direction of the arrow. For details of the structure and function of this conveyor reference is hereby made to the above-noted patent application to E. W. Tangard. Receivers 12 are moved in succession by the conveyor past a loading location defined by the intersection of the path of movement of the receivers 12 and the path in which articles such as pieces of letter mail are fed by a feeding device generally indicated at 14. The feeding device 14 is disposed adjacent conveyor 10 and is effective to feed letters in one-by-one succession from a releasably supported position within a retainer generally designated by the reference numeral 16, through a chute generally designated at 18, and to the loading location thereby to load successive ones of said receivers. A plurality of feeding devices 14 may be disposed in tandem along the direction of movement of the conveyor. Since the individual feeding devices may be identical to each other, a description of one will suffice for all.

Retainer 16, as shown in FIGS. 1 and 3, includes an inverted U-shaped, upper member 20 supported at each side by brackets 22, 22 on a pair of spaced standards 24, 26. Standards 24, 26, along with a base 28, form a portion of the framework of the conveyor 10. Retainer 16 further includes a comb 30 similarly mounted on standards 24, 26 and having downwardly projecting fingers 32. Opposite comb 30 is another comb 34 having somewhat similar fingers 36. It will be noted from FIG. 3 that the distal ends of fingers 36 extend across a major portion of the bottom of retainer 16 and terminate at the distal ends of fingers 32 to close the bottom of the retainer. Comb 34 is hinged at 38 to U-shaped member 20 for pivotal movement between the closed position shown in FIG. 3 and the open position shown in FIG. 4. This pivotal movement is effected by means later to be described.

Articles such as pieces of letter mail 40 are delivered to retainer 16 in timed relation to the speed of conveyor 10, by means such as a spring clamp 42. Spring clamp 42 is supported by a bracket 44 which is carried by a sprocket chain 48, the latter being in mesh with a sprocket wheel 50. By virtue of means not shown since it forms no part of the instant invention, letters are inserted into spring clamp 42, and sprocket chain 48 is trained about another sprocket wheel and driven in timed relation with the movement of conveyor 10 to move the letter-carrying clamp 42 from the left to the right as viewed in FIGS. 1 and 6 to deliver letters in one-by-one succession to the retainer 16. As the spring clamp approaches the right-hand end of retainer 16, a cam 52, carried by standard 26 as best shown in FIG. 6, is engaged by a cam follower roller 54 which opens the jaws of the spring clamp to drop the letter 40 to the bottom of retainer 16 as shown in FIG. 3. An enlarged view of clamp 42 and cam 52 is shown in FIG. 7 just after the former has been opened by the latter. An adjusting screw 56 may be provided in a conventional manner as shown in FIG. 1 for adjusting the tension of sprocket chain 48.

The means for feeding letters 40 in one-by-one succession from the releasably supported position in retainer 16 to the loading location will now be described. This means includes a non-shiftable feed roller generally designated at 60, three separate, side-by-side, laterally shiftable feed rollers generally designated at 62, and a driving roller generally designated at 64. Non-shiftable feed roller 60 comprises a plurality of integral roller sections keyed to a shaft 68, and each of the roller sections provides a plurality of rubber-faced roller wheels 66. Shaft 68 is rotatably supported in bearings provided by standards 24, 26. Each of the laterally shiftable feed rollers 62 takes the form of a separate roller section providing a plurality of rubber-faced roller wheels 70. As is apparent from FIG. 5, a roller wheel 70 is opposite each of the roller wheels 66. Each of the laterally shiftable feed rollers 62 is supported for free and mutually independent rotation about a separate shaft 72 by means such as ball bearings 74 as shown in FIG. 5. Each of shafts 72 is carried at its outer ends by the distal ends of a pair of levers 76. The proximal end of each lever 76 is pivotably disposed about a rocker shaft 78, the latter being rockably mounted in bearings supported by standards 24, 26. For each pair of levers 76, there is an actuating lever 80 fixed on rocker shaft 78 and carrying a laterally projecting pin 82. Another laterally projecting pin 84 carried by one lever 76 of each pair overlaps each of pins 82 at a location between the ends of a torsion spring 86. It will be apparent that each torsion spring 86 resiliently biases the respective pair of levers 76 associated therewith to a neutral position relative to the associated actuating lever 80 and relative to the rocker shaft 78. Rocker shaft 78 is rockable by means later to be described to swing or shift each of the feed rollers 62 between a retracted position as shown in FIG. 3 and an advanced position as shown in FIG. 4.

With shiftable feed rollers 62 in their retracted position as shown in FIG. 3, a peripheral surface of each of these feed rollers is disposed in driven engagement with a peripheral surface of a rubber-faced roller wheel 88 of drive roller 64. Each of roller wheels 88 is keyed to a shaft 90 which, in turn, is rotatably supported in bearings provided by standards 24 and 26.

Each of shafts 68 and 90, which respectively mount feed roller 60 and drive roller 64, is driven at a speed proportional to the speed of movement of the conveyor at any desired conventional means. One such conventional arrangement is schematically shown in FIG. 8 wherein a sprocket chain 92 of conveyor 10 is in driven mesh with a sprocket wheel 94, and the latter rotates an input shaft 96 of a gear box 100. An output shaft 98 of the gear box drives a sprocket wheel 102 which, in turn, drivingly engages sprocket chains 104 and 106. Chains 104 and 106 are trained about sprocket wheels 108 and 110 and about sprocket wheels 112 and 114, respectively. Chain-driven wheels 110 and 114, as shown in FIG. 1 as well as in FIG. 8, are keyed to and rotatably drive shafts 90 and 68, respectively. As also shown in FIGS. 1 and 8, shaft 90, to which roller wheels 88 of drive roller 64 are keyed, has a pinion 116 fixed at one end. Pinion 116 meshes with a gear 118 which is rotatable about a stub shaft 122 fixedly carried by the standard 26. As best shown in FIGS. 2 and 3, rocker shaft 78 has fixedly secured thereto an arm 124 carrying a cam follower roller 126 riding in cam groove 120. It will be apparent that a full 360° rotation of gear 118 is effective to rock shaft 78 to shift feed rollers 62 from the retracted position of FIG. 3 to the advanced position of FIG. 4 and back again to the retracted position. As shown in FIGS. 1, 3 and 4, rocker shaft 78 also fixedly carries a lever 128 pivotally connected to one end of a link 130, the latter being pivotally connected at its opposite end to one end of a transverse link 132. The opposite end of transverse link 132 is fixed to hinged comb 30 whereby rocking movement of rocker shaft 78 from the retracted position of FIG. 3 to the advanced position of FIG. 4, effects opening of the bottom of receiver 16 as described above and shown in FIG. 4. Return of rocker shaft 78 to the retracted position, of course, effects re-closing of the bottom of receiver 16.

In its retracted position, rocker shaft 78, through the intermediary of torsion springs 86, is effective to resiliently bias a peripheral surface of each of laterally shiftable feed rollers 62 into rotatably driven engagement with the peripheral surface of one of the roller wheels 88 of drive roller 64. Each of feed rollers 62 is thereby individually driven by one of roller wheels 88 at a speed proportional to that of conveyor 10 and in the direction of rotation opposite to that of driving roller 64. Shaft 68 is driven as previously described to rotate feed roller 60 continuously in the same direction as drive roller 64 and in the direction opposite to that in which laterally shiftable feed rollers 62 are rotated.

The peripheral feeding surfaces of roller wheels 66 of feed roller 60 project through the respective spaces between the fingers 36 of hinged comb 34. The peripheral feeding surfaces of the roller wheels of shiftable feed rollers 62, when the latter are in the advanced position shown in FIG. 4, project through the respective spaces between fingers 32 of comb 30.

In operation, and with the respective parts in the positions as shown in FIG. 3, non-shiftable feed roller 60 is being driven in the counterclockwise direction, drive roller 64 is also being driven in the counterclockwise direction, and shiftable feed rollers 62 are being driven by drive roller 64 in the clockwise direction to move the peripheral feeding surfaces of the roller wheels 70 of feed rollers 62 about a closed path at the same speed as the peripheral feeding surfaces of the roller wheels 66 of non-shiftable feed roller 60 are being moved about their closed path. Cam-providing gear 118 rotates in the clockwise direction to rock shaft 78 in the clockwise direction whereupon each of pins 82 assumes a neutral position with respect to its associated pin 84 and all of these pins then move concurrently to effect shifting of feed rollers 62 out of engagement with drive roller 64 and toward the advanced position of FIG. 4. At the same time, the bottom of retainer 16 starts to open as lever 128 is pivoted by the rocker shaft. In moving to the advanced position, the peripheral feeding surfaces of each of shiftable feed rollers 62 move against a letter 40 releasably supported in retainer 16 and bias the letter against the peripheral feeding surfaces of feed roller 60. Each of the laterally shiftable feed rollers 62 has substantial mass and, by virtue of their momentum, they continue to rotate when moved to the advanced position. With shiftable feed rollers 62 in the advanced position shown in FIG. 4, the bottom of retainer 16 is open and letter 40 in the retainer is biased at opposite sides by the oppositely rotating feed rollers 60 and 62, whereby the letter is impelled downwardly through chute 18 to the loading location. It is to be noted that the time interval during shifting of feed rollers 62 from the retracted to the advanced position is sufficiently short that only an insignificant amount of downward movement of the letter occurs between opening of the bottom of retainer 16 and shifting of feed rollers 62 to the advanced position.

As cam-providing gear 118 continues to rotate after the feeding of a letter, rocker shaft 78 is effective to close the bottom of retainer 16 and to shift feed rollers 62 back to the retracted position at which the latter are again disposed in driven engagement with drive roller 64. Another letter 40 is delivered to the retainer 16 and, with continuous movement of conveyor 10, the cycle described above goes on to repeat itself so that successive ones of the receivers 12 will be loaded by the feeding device 14.

The chute 18 is defined by a pair of spaced walls 134, 136; wall 134 being supported by standards 24, 26 and wall 136 being hinged at 138 for pivotal movement in the clockwise direction as viewed in FIG. 3. A handle 140 can be grasped to release, from a spring detent 142, a latch 144 carried by wall 136 thereby to provide convenient access to chute 18. Also to accommodate the possibility of a jam, a chute extension 146 is formed of a material such as flexible rubber so as to be deflected rather than to tear or otherwise mutilate the jammed letter.

Because feed rollers 60 and 62 are rotatably driven at a speed proportional to that of conveyor 10 and because the frequency with which feed rollers 62 are shifted between their retracted and advanced positions is proportional to the speed of conveyor 10, the speed and frequency of letter feeding are likewise proportional to the conveyor speed. Consequently, feeding device 14 provides the features and advantages noted above in the general description of the disclosed embodiment of the invention. In this connection, it will be noted that with feeding devices which feed at only one particular speed (such as gravity-feed devices), the greater the distance each letter must be fed to reach the loading location, the greater will be the resulting error in timing between each fed letter and the receiver intended to be loaded thereby, upon a change in conveyor speed. This resulting error, even when comparatively small, would result in the letters being loaded into receivers other than the intended ones even if a jam is avoided. For the purposes of this description a jam may be defined as the condition which occurs when the trailing edge of a letter fails to be fed past the mouth of a receiver before the trailing portion of that receiver moves past the end of chute extension 146. No problem arises with feeding device 14 in connection with the distance each letter is fed because the ratio of conveyor speed to letter-feeding time remains constant with changes in the speed of the conveyor.

The feeding device 14 provides substantial advantages apart from those involved with variations in the speed of the conveyor 10. For example, feeding device 14 exercises positive, forcible control over the letters when fed thereby as distinguished from gravity-feed devices. Also, the maximum speed at which the conveyor 10 could be moved if driven at a constant speed or otherwise would not be limited by the comparatively slow letter-feeding speed as would be effected by a gravity-feed device.

Frequently letters will be non-uniform in thickness from one side to the other, and this contingency is accommodated with feeding device 14 by the resilient or yielding connection between rocker shaft 78 and each of shiftable feed rollers 62. In this regard, when each feed roller 62 begins to bias a letter 40 against feed roller 60, the respective pin 82 moves against the bias of the respective torsion spring 86 to permit lost-motion of rocker shaft 78 relative to that feed roller 62. With a letter having, for example, a gradually increasing thickness from left to right as shown with exaggeration in FIG. 5, righthand feed roller 62 would first bias the letter against feed roller 60, followed by movement relative thereto of the other two feed rollers 62 until the center feed roller 62 biased the letter against feed roller 60, after which movement of the left-hand feed roller 62 would occur relative to the other two feed rollers until the left-hand feed roller 62 biased the letter against feed roller 60. It is to be recognized that, so long as the side-to-side thickness variations of each letter are sufficiently small, the amount of relative movement among feed rollers 62 is very small and consequently of such a short duration that only a very small time interval will ensue between movement of the first and last feed roller 62 to fully advanced position. This slight amount of relative movement among feed rollers 62 is effective, however, to ensure that the letter 40 will be fed evenly by all of the feed rollers 62 then laterally adjacent that letter.

In order to adapt the feeding device 14 to accommodate letters having greater thickness variations from side-to-side, the modification thereof as illustrated in FIGS. 9–12 may be utilized. Except as will hereinafter be specifically pointed out otherwise, the structure and function of the respective parts according to this modification are identical with their counterparts in the embodiment of FIGS. 1–8. As with the feeding device of the embodiment of FIGS. 1–8, the modification of FIGS. 1–9 includes a non-shiftable, rotatably driven feed roller generally designated at 150 and three mutually independent, laterally shiftable feed rollers generally indicated by the reference numeral 152. As is the case with the embodiment of FIGS. 1–8, the modification of FIGS.

9–12 is effective to feed a letter each time the condition occurs that the non-shiftable feed roller is rotated while the laterally shiftable feed rollers are in their advanced position with a letter disposed between the feed rollers. The main difference between the embodiment of FIGS. 1–8 and the modification of FIGS. 9–12 is that the non-shiftable feed roller of the former, being continuously driven, is rotatably driven before the shiftable feed rollers are shifted to their advanced position whereas the shiftable feed rollers of the latter are shifted to their advanced position before the non-shiftable feed roller is rotatably driven. The result of this is that, with this modification, all relative movement among the shiftable feed rollers 152, in moving to their advanced position, is completed before feeding of the letter can start. Consequently, greater variations in thickness of the letters from side-to-side can be accommodated by this modification without uneven feeding of the letters from side-to-side.

In a manner similar to their respective counterparts in the embodiment of FIGS. 1–8, non-shiftable feed roller 150 is keyed to a rotatably driven shaft 154 and each of shiftable feed rollers 152 is freely rotatable about a separate shaft 156. Also, each shaft 156 is independently supported for laterally shiftable movement between an advanced position and a retracted position by means of a pair of levers 158 (only one of which is shown in each of FIGS. 9–12) which are resiliently or yieldably biased to a neutral pivotal position about a rocker shaft 160. In addition, the modification of FIGS. 9–12 includes two additional non-shiftable feed rollers 162 and 164 keyed to driven shafts 166 and 168, respectively. Shafts 154, 166 and 168 are supported for rotation in bearings carried by a pair of standards 170 (only one of the latter being shown in each of FIGS. 9–12) as are each of a pair of idler shafts 172 and 174. Idler shaft 172 fixedly carries an idler gear 176 in mesh with gears 178 and 180 carried by shafts 154 and 166, respectively; and an idler shaft 174 fixedly carries an idler gear 182 in mesh with a gear 180 and a gear 184, the latter being fixedly carried by shaft 168. A gear train is thus established whereby rotation of feed roller shaft 154 effects concomitant rotation of feed roller shafts 166 and 168.

Rocker shaft 160 extends through apertures intermediate the ends of three pairs of bell crank levers 186 and through apertures intermediate the ends of three other pairs of bell crank levers 188 (only one of each of these levers being shown in FIGS. 9–12). In this manner, each of levers 186 and 188 is mounted for pivotal movement about rocker shaft 160. Each pair of levers 186 carries a shaft 190 about which a feed roller 192 freely rotates, and each pair of levers 188 carries a shaft 194 about which a feed roller 196 freely rotates; all in the same manner as each pair of levers 158 carries one of the shafts 156 about which one of the shiftable feed rollers 152 freely rotates. The opposite end of each lever 186 is connected to one end of a tension spring 198 as is the opposite end of each lever 188 whereby each of feed rollers 192 and 196 is laterally shiftable to the extent necessary to accommodate the thickness (and variations thereof) of the letters to be fed.

A retainer generally designated at 200 is, as with retainer 16 of the embodiment of FIGS. 1–8, in the form of opposing combs which provide a plurality of slots through which the peripheral feeding surfaces of feed rollers 150 and 152 project. A gate 202 is fixed on a rocker shaft 204 for pivotal movement between the closed position of FIGS. 9 and 10 and the open position of FIGS. 11 and 12 just as does the bottom forming member of the retainer 16. Preferably, gate 202 is actuated by rocker shaft 160 through a linkage which, in a well known manner, provides lost-motion permitting the gate to open after feed rollers 152 are in their advanced positions. This is possible with this modification, of course, because feed roller 150 is not rotatably driven until after feed rollers 152 have been shifted to their advanced position. A guide chute generally designated at 206 corresponds to guide chute 18 of the embodiment of FIGS. 1–8 except that chute 206 is also in the for mof opposed combs providing a plurality of slots through which project the peripheral feeding surfaces of feed rollers 162, 164, 192 and 196.

The drive for feed roller shaft 154 and rocker shaft 160 is the same as that for roller shaft 90 and rocker shaft 78, respectively, of the embodiment of FIGS. 1–8 except that, instead of sprocket wheel 114 directly and continuously rotating the shaft 68 as shown in FIG. 7, a Geneva-type mechanism is interposed between wheel 114 and shaft 68 to effect a stop-and-go rotation of the latter shaft. This Geneva-type mechanism is of a conventional design to effect stop-and-go rotation of feed roller shaft 154 in the manner to be pointed out as follows. With the parts in their respective positions as shown in FIG. 9, feed roller shaft 154 remains at rest while the shiftable feed rollers 152 shift laterally to the advanced position as shown in FIG. 10 and while gate 202 thereafter pivots to open position. Shaft 154 then accelerates up to a constant speed within a time interval sufficiently short that letters of the smallest height accommodated by the feeding device will not have been completely fed from between the feed rollers before the latter reach said constant speed. The time interval during which the feed rollers are driven at constant speed is sufficiently long that the longest letters accommodated by the feeding device will have cleared the feed rollers before the latter begin decelerating to zero speed. Shiftable feed rollers 152, 192 and 196 remain in frictional engagement with opposed non-shiftable feed rollers 150, 162 and 164, respectively, until the latter decelerate to zero speed. In this manner, all of the shiftable feed rollers are brought to zero speed after each letter is fed. Shiftable feed rollers 152 then laterally shift back to their retracted positions as shown in FIG. 9 and, with the feed rollers again at zero speed, the cycle goes on to repeat itself whereby a letter is fed to one of the receivers during each cycle. The constant speed of the peripheral feeding surfaces of the feed rollers, at which speed each letter is impelled to the loading location, will, of course, be proportional to the speed of the conveyor because the latter positively drives non-shiftable feed rollers 150, 162 and 164. The frequency at which the letters are fed will likewise be proportional to the speed of the conveyor because, as pointed out above, the conveyor positively drives not only the rotatably driven non-shiftable feed rollers 152 but also the rocker shaft 160 which shifts feed rollers 152 between their advanced and retracted positions.

It will be recognized that variations in the thickness of the individual letters from the lower to the upper edges thereof, as well as from side-to-side thereof, will also be accommodated by both the embodiment of FIGS. 1–8 and the modification of FIGS. 9–12 due to the yieldable connection between the respective rocker shaft and each of the shiftable feed rollers mounted thereon.

Dimensions of certain of the parts as shown in the drawing have been modified for the purposes of clarity of illustration.

Since many changes could be made in the embodiment of the invention and modification thereof as particularly described and shown herein without departing from the scope of the invention, it is intended that this embodiment and modification thereof be considered as exemplary and that the invention not be limited except as warranted by the following claims.

What is claimed is:

1. In combination: a continuously movable, variable speed conveyor including a plurality of receivers continuously movable at variable speeds in one-by-one succession past a loading location; a feeding device adjacent said conveyor; said feeding device comprising a first feed roller and a second feed roller; means mounting said first feed roller for shifting of the latter from a retracted position to an advanced position; said first feed roller, when in said retracted position, being spaced from said second feed roller to permit an article to be disposed between said feed rollers and, when moved to said advanced position, biasing said article against said second feed roller; means operatively arranged for rotatably driving one of said feed rollers at a speed proportional to that of the conveyor; and means operatively arranged for shifting said first feed roller between said advanced and retracted positions with a frequency proportional to the speed of the conveyor whereby an article is impelled from between the feed rollers into each of certain successive ones of said receivers regardless of changes in the speed of the conveyor.

2. In combination: a continuously movable, variable speed conveyor including a plurality of receivers continuously movable at variable speeds in one-by-one succession past a loading location; a device disposed adjacent said conveyor for feeding letters or like articles to said loading location; said device comprising a first rotatable feed roller and a second rotatable feed roller; means operatively arranged for shifting said first feed roller alternately between a retracted position and an advanced position; said first feed roller, each time it is shifted to said retracted position, being spaced from said second feed roller to permit one of said articles to be disposed between the feed rollers and, when moved to said advanced position, biasing an article disposed between the feed rollers against said second feed roller; means operatively arranged for rotating one of said feed rollers at a speed proportional to that of the conveyor whereby an article is impelled from between said feed rollers to said loading location at a speed proportional to that of the conveyor each time the condition occurs that said one feed roller is being rotated while said first feed roller is in said advanced position; and means for driving said shifting means and said rotating means in timed relation to the speed of said conveyor to repetitively effect said condition at a frequency proportional to the speed of the conveyor whereby an article is impelled into each of certain successive ones of said receivers regardless of changes in the speed of the conveyor.

3. In combination: a continuously movable, variable speed conveyor; a plurality of receivers carried by said conveyor for movement of said receivers in one-by-one succession past a loading location; a device disposed adjacent said conveyor for feeding letters or like articles to said loading location; said device comprising a first feed member and a second feed member; each of said feed members having a peripheral surface movable in a feeding direction; means operatively arranged for shifting said first feed member alternately between a retracted position and an advanced position; said first feed member, each time it is shifted to said retracted position, having its peripheral surface spaced from that of the second feed member to permit one of said articles to be disposed between the feed members and, each time it is shifted to said advanced position, having its peripheral surface bias an article disposed between the feed members against the peripheral surface of said second feed member; means operatively arranged for moving the peripheral surface of one of said feed members in the feeding direction at a speed proportional to that of the conveyor whereby an article is impelled from between said feed members to said loading location each time the condition occurs that the peripheral surface of said one feed member is being moved in said feeding direction while said first feed member is in said advanced position; and means for driving said shifting means and said moving means in timed relation to the speed of said conveyor to repetitively effect said condition at a frequency proportional to the speed of the conveyor whereby an article is impelled into each of certain successive ones of said receivers regardless of changes in the speed of the conveyor.

4. In combination: a continuously movable, variable speed conveyor; a plurality of receivers carried by said conveyor for movement of said receivers in one-by-one succession past a loading location; a device disposed adjacent said conveyor for feeding letters or like articles to said loading location; said device comprising a pair of oppositely rotatable feed rollers; means operatively arranged for shifting one of said feed rollers alternately between a retracted position and an advanced position; said one feed roller, each time it is shifted to said retracted position, being spaced from the other feed roller to permit one of said articles to be disposed between the feed rollers and, when in said advanced position, biasing an article disposed between the feed rollers against said other feed roller; means operatively arranged for rotating said other feed roller at a speed proportional to that of the conveyor whereby an article is impelled from between said feed rollers to said loading location at a speed proportional to that of said conveyor each time the condition occurs that said other feed roller is being rotated while said one feed roller is in said advanced position; and means for driving said shifting means and said rotating means in timed relation to the speed of said conveyor to repetitively effect said condition at a frequency proportional to the speed of the conveyor whereby an article is impelled into each of certain successive ones of said receivers regardless of changes in the speed of the conveyor.

References Cited in the file of this patent

UNITED STATES PATENTS

| | | |
|---|---|---|
| 1,193,693 | Ielfield | Aug. 8, 1916 |
| 1,482,834 | Barry | Feb. 5, 1924 |
| 2,416,398 | Marchand | Feb. 25, 1947 |
| 2,757,928 | Thomas | Aug. 7, 1956 |